Figure 1:
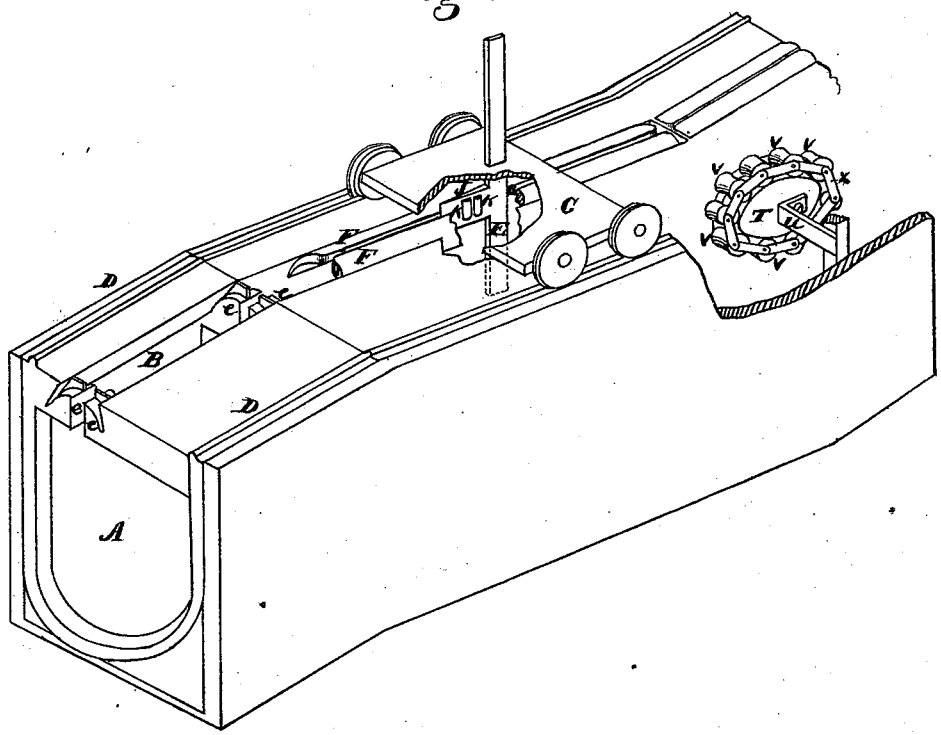

A. S. HALLIDIE.
Endless Rope-Traction Ways.

No. 163,865. Patented June 1, 1875.

Witnesses
Geo H Strong
Jno. L Roche

Inventor
Andrew S. Hallidie
by Dewey & Co
Attys

UNITED STATES PATENT OFFICE.

ANDREW S. HALLIDIE, OF SAN FRANCISCO, CALIFORNIA.

IMPROVEMENT IN ENDLESS-ROPE TRACTION-WAYS.

Specification forming part of Letters Patent No. 163,865, dated June 1, 1875; application filed March 8, 1875.

CASE B.

*To all whom it may concern:*

Be it known that I, ANDREW S. HALLIDIE, of San Francisco city and county, State of California, have invented Improvements in Endless-Rope Traction-Railways; and I do hereby declare the following description and accompanying drawings are sufficient to enable any person skilled in the art or science to which it most nearly appertains to make and use my said invention or improvement without further invention or experiment.

My invention relates to certain improvements in that class of railways in which an endless wire-rope, moving in an underground tube, is used for propelling the car along a track. In this class of railways a griping device, which is secured upon the car, has a shank passing down through a slot in the upper side of the tube, and to the lower end of which, inside of the tube, the griping-jaws are arranged to gripe the rope.

My invention relates, first, to an improved device for closing the slot, in order to prevent it from becoming clogged by the lodgment of foreign substances in it, and to prevent the wheels of vehicles from dropping into it; and, secondly, to an improved pulley, for supporting and guiding the rope where it changes its direction at the top or bottom of an incline.

In order to more fully describe my invention, reference is had to the accompanying drawings, in which—

Figure 1 is a perspective view of my invention.

A is the underground tube, having the longitudinal slot B extending its entire length along its upper side. C is the car, whose wheels move along the tracks D D upon each side of the slot; and E is the shank of the griping attachment, which passes down through the slot. To close the slot B, in order to prevent its clogging and the entrance of the wheels of vehicles into it, I employ two parallel strips or bars, F F, of wood, metal, or other suitable material, the combined width of which is equal to the width of the slot.

These strips or bars can be made of any desired length; but I prefer to construct them in short lengths, so that they will operate easily.

At intervals somewhat less than the length of the strips or bars F F, I make projections *e e* opposite each other, on each side of the slot, and slightly below the top of the tube, which will project partially across it, but leave sufficient space between them to permit the shank of the griping attachment to pass. The faces or edges of the slot B I bevel inward, as shown. The strips or bars F F are made semicircular on their under side, and the upper edges of the projections *e* are also made circular, so as to form corresponding seats for the ends of the strips to rest in. The upper outside edge of the strips next to the side of the slot is also rounded off, so that their meeting-edges can be lifted apart, and thus permit the shank of the griping attachment to pass along between them, their outside edges resting on the projections *e*. The outer edges of the strips being heaviest, they will drop together again by gravity after the shank has passed from between them.

A vertical spacing-plate can be used to separate the ends of the strips, if desired.

In order to separate the strips in advance of the shank, I attach a wedge vertically to the shank, in a line with the joint between the strips. The point of this wedge projects in front of the shank, and separates the strips, so that the shank will enter between them. Two rollers, K K, can be secured vertically in the wedge, if desired, so that one will bear against the edge of each strip, and thus prevent the friction from wearing away the wedge and shank.

I thus provide a device for closing the slots in the tube which is easily operated, and which will be strong enough to resist any ordinary pressure from above, as the greater the strain upon them the more firmly will they be pressed together.

It frequently happens that the direction of the tube must be changed from an inclined position to a horizontal position, or vice versa. When this happens it is necessary to pass the rope either under or over a pulley at the angle, so as to prevent it from striking against the bottom or top of the tube. The bearing of an ordinary circular pulley is too abrupt for this purpose. I therefore construct a pulley for this purpose, as follows: At the point where the bend in the wire is to occur I secure an oval form, T, by means of an arm, u, which extends out from the frame of the tube. Around this oval form I then secure a series of small travelers or pulleys, v v v, which are united together by means of links x x x, in the manner of forming an endless chain. This endless series of travelers encircles the oval form, so that when the traveling rope bears against its surface the pulleys will travel around the form, and thus form a bearing-pulley for the rope. The oval form is so mounted at the angle that the rope will bear against its side or longest curve, thus providing a long bearing in a narrow space, where otherwise a small pulley would have to be used, to the detriment of the rope.

Having thus described my invention, what I claim, and desire to secure by Letters Patent, is—

1. The slot-closing strips F F, constructed and applied, as described, so as to close together automatically by gravity, substantially as and for the purpose described.

2. The shank E, with wedge attachment J and friction-rollers k k, in combination with the strips or bars F F, substantially as described, and for the purpose specified.

3. The tube A, having the sides of the slot B beveled inward, as described, and having the projections e e with their rounded upper surface, in combination with the strips or bars F F with their concave under sides and rounded upper outside corner, substantially as and for the purpose described.

4. The improved pulley, consisting of the oval form T, with its encircled series of connected rollers or pulleys v v v, connected by links x x x, substantially as and for the purpose described.

A. S. HALLIDIE.

Witnesses:
GEO. H. WALLIS,
SAML. HERMANN.